May 23, 1950                H. H. STYLL                2,508,872
VARIABLE SIZE BRACE-BAR FOR SPECTACLE MOUNTINGS
Filed Aug. 27, 1945                                2 Sheets—Sheet 1
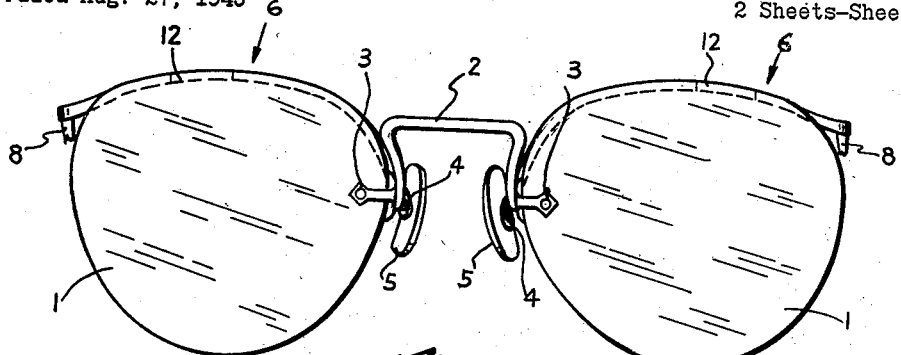
Fig. I
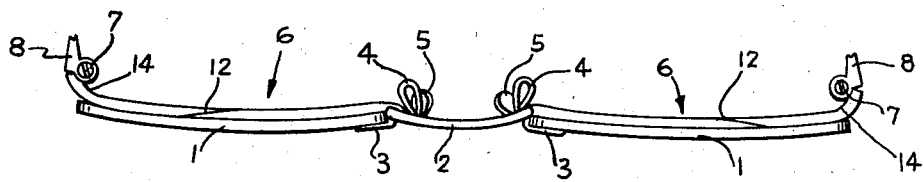
Fig. II
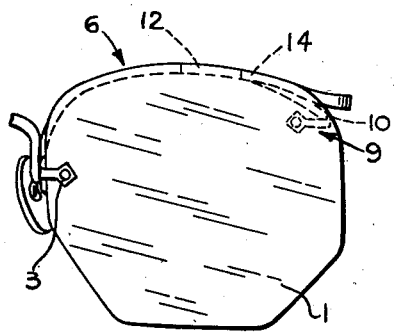
Fig. III
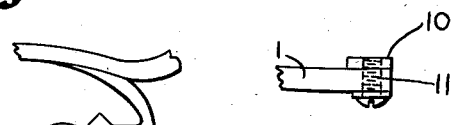
Fig. IV      Fig. VI
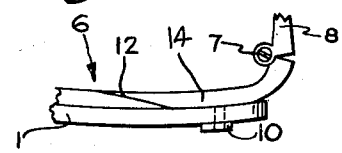
Fig. V
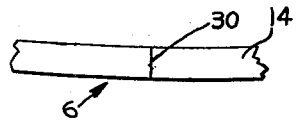
Fig. VII
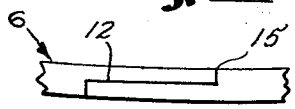
Fig. VIII
INVENTOR
HARRY H. STYLL
BY
*Louis L. Gagnon*
ATTORNEY May 23, 1950  H. H. STYLL  2,508,872
VARIABLE SIZE BRACE-BAR FOR SPECTACLE MOUNTINGS
Filed Aug. 27, 1945  2 Sheets-Sheet 2
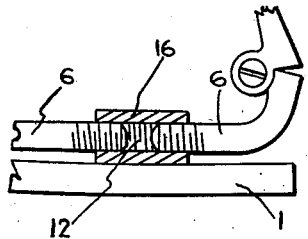
Fig. IX
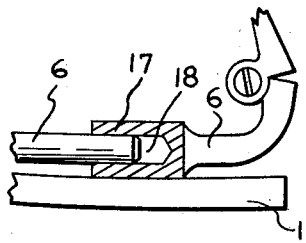
Fig. X
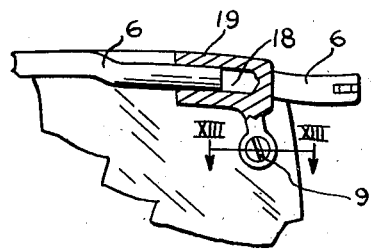
Fig. XI
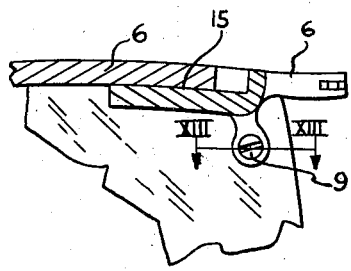
Fig. XII
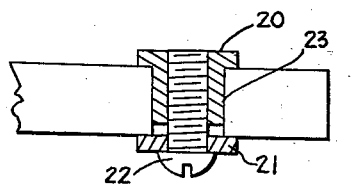
Fig. XIII
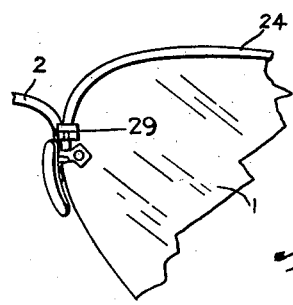
Fig. XIV
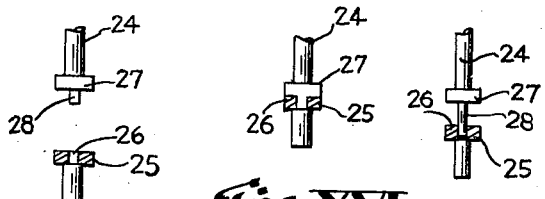
Fig. XV  Fig. XVI  Fig. XVII
INVENTOR
HARRY H. STYLL
BY
Louis L. Gagnon
ATTORNEY Patented May 23, 1950

2,508,872

UNITED STATES PATENT OFFICE 2,508,872

VARIABLE SIZE BRACE-BAR FOR SPECTACLE MOUNTINGS

Harry H. Styll, Southbridge, Mass., assignor to American Optical Company, Southbridge, Mass., a voluntary association of Massachusetts.

Application August 27, 1945, Serial No. 612,859

2 Claims. (Cl. 88—41)

This invention relates to improvements in ophthalmic mountings and more particularly to improvements in semi-rimless spectacles.

A principal object of the invention is to provide separable rim members for a semi-rimless spectacle and facile means for securely securing them together whereby the stock of semi-rimless mountings, that it is now necessary to carry, owing to the variation of size requirements of the wearers, may be reduced.

Another object of the invention is to provide semi-rimless spectacle rim members with facile means by which the size variation in wearer requirements may be provided for to fill the particular wearer's needs and for securing the parts securely in the said adjusted relation.

Another object of the invention is to provide simple, facile and economical means for adjusting the rim members of semi-rimless spectacles to the wearer's requirements and securing them in the said position, without destroying the appearance of the article.

Another object of the invention is to provide means by which the number of stock mountings now necessary to be produced by the manufacturer and carried by the dispenser can be greatly reduced thereby reducing materially the investment now required to produce and stock the said mountings.

Other objects and advantages of the invention will become apparent from the following description taken in conjunction with the accompanying drawings. It will be apparent that many changes in the details of construction and arrangement of parts may be made without departing from the invention as set forth in the accompanying claims, so it is not desired that the invention be confined to the matters shown and described, as the preferred forms and arrangements are given for the sake of illustration only.

Referring to the drawings:

Fig. I is a front view of a semi-rimless spectacle embodying one form of the invention.

Fig. II is a top view of Fig. I.

Fig. III is a front view of one side of a semi-rimless mounting showing means for connecting the rim on the temple side and embodying the invention.

Fig. IV is a partial portion showing the rim connection to the lens on the rear or face side thereof of the construction shown in Fig. III.

Fig. V is a fragmentary portion of the rim and lens as seen from the top, and showing one form of the rim connection of the invention.

Fig. VI is a partial top view showing a fragmentary portion of the lens and the lens connection of the construction shown in Fig. III.

Fig. VII is a top view of a fragmentary portion of the rim showing one form of separable rim connection.

Fig. VIII is a view similar to Fig. VII, but showing another form of separable rim connection.

Fig. IX is a view similar to Fig. VII, showing another form of separable rim connection.

Fig. X is a view similar to Fig. VII, showing another form of separable rim connection.

Fig. XI is a fragmentary back view of lens and rim showing another form of separable rim connection.

Fig. XII is a view similar to Fig. XI showing another form of separable rim connection.

Fig. XIII is a cross-section on line 13—13 of Figs. XI and XII.

Fig. XIV is a partial rear view of a mounting showing another form of rim connection located on the nasal side.

Fig. XV is an elevation showing the rim connection of Fig. XIV with the parts separated.

Fig. XVI is an elevation partly in section of the parts of Fig. XV in engaged position, and Fig. XVII is an elevation partly in section of the parts of Fig. XV in another engaged position.

Semi-rimless spectacle mountings as now produced by the manufacturer and supplied the dispenser comprise two rim portions connected together securely by a bridge portion. This whole construction is sold and stocked as a single unit.

There are many different forms and styles of bridges that are now employed. The wearer has therefore a selection as to the form or style of bridge he needs or desires.

Also, the distance between the eyes, or the pupillary distance, as it is called in the art, varies for different wearers, hence different sizes as to width of rims must be provided.

As these semi-rimless mountings are now provided and stocked the bridges are permanently and securely attached to the rims, and the length or width of the rims is provided for by making the mounting structure in a series of different length rims.

This procedure requires a complete semi-rimless mounting for each style of bridge and a complete semi-rimless mounting for each length of rim, one for each length of the series.

This requires a great duplication of production and stock that must be carried.

It is therefore a principal object of this invention to reduce the number of mountings that have to be made and stocked by making the rims separable and providing facile and economical means by which the separable parts may be securely united by the dispenser to provide for the length of rim required, and the type of bridge needed or desired by the wearer, thus facilitating greatly the production and stocking of these mountings.

Therefore, from the standpoint of economy, the facility of production, and the prevention of duplication and the elimination of waste, the invention is of great and first importance, particularly under war time conditions where materials are scarce and man power restricted.

Referring to the drawings wherein like reference characters denote corresponding parts throughout:

In Figs. I and II is shown a semi-rimless spectacle mounting wherein a pair of lenses 1 are held in alignment by a bridge member 2 for spanning the nose. The respective ends of the bridge member are secured to the lens holding straps 3. Also secured to the straps 3 are guard arms 4, extending inwardly and carrying the nose guards 5, at their inner ends. The nose bridge 2, the straps 3, and the guard arms 4 and guards 5, comprise in unison the central supporting means of the mounting. The lenses 1 are held in position by the lens straps 3 by lens screws or other means securely uniting the straps and lenses.

Secured to the lens straps 3 or other portions of the central supporting means are the temple supporting members. These temple rim-like supporting members follow the contour of the top edges of the lenses 1, preferably to the rear of the lenses, although they may be placed on top of the lenses and in the plane thereof if desired. The members 6 turn rearward adjacent the temple edges of the lenses and terminate in a pivotal temple connections 7. The temples 8 are pivotally connected to the members 6 at the connection 7.

In Fig. III is shown a modification in which the members 6 are secured to the lenses adjacent their temple sides by a securing member or strap 9. This strap member 9 comprises a strap ear and a supporting arm 10 carried by the rim member 6, as shown in Fig. IV. The strap ear 10 is secured to the lens 1 by the screw 11, shown in Fig. VI.

The object of the strap connection 9 to the lenses on their temple sides is to provide additional support to the rim members 6 to hold the said members 6 in secure alignment with the lenses and to prevent bending or displacement of the said rim members 6.

To provide for the variation in width of the lenses required by wearers having a difference in the distance between the centers of the pupils of the eyes, and also to provide for the variation in facial needs or taste of different wearers as to the form and style of the bridge member desired or required the rim members 6 are made in two pieces. The separation of the rim members 6 is positioned at a desired position between the temple end and the end secured to the central supporting bridge structure as shown at 12 in Figs. I, II and III. The joint 12 is preferably placed where it may be the most inconspicuous and is the most easily assembled.

Where the rim members 6 are made in two separated parts, the portion 14 for the temple side extends from the joint 12 to the temple connection 7 where it is provided with temple connecting means, preferably hinge connecting means. The portion on the nasal side extends from the joint 12 to a connection with the central bridge portion adjacent the lens straps 3.

The nasal portion of the mounting comprises the bridge 2, the straps 3, the guard arms and guards 4 and 5 and the portion of the rim 6 extending from the central supporting portion to the joint 12, and all of those parts secured together as a unitary construction.

In the case of the construction shown in Fig. III, the outer or temple portion of the rim member 6, also carries the strap connection 9 and its associated means 10 and 11.

If the rim members 6 are thus made in two portions, the inner or nasal side portion may be made with various forms or types of bridges 2 to suit individual taste or requirements, and the outer or temple portion may be made either with or without the strap connections 9, depending on the type of mounting that is to be made.

With the parts of the mounting made in this way a wearer may have his mounting made to suit the width required by his pupillary distance and with the type of bridge he wants or needs, whereas, if the mountings are made with the rim members 6 undivided it is necessary to make complete mountings for each style of bridge in all the numbers of graded width to cover the range of wearer requirements. This runs into a great duplication of stock that has to be carried by the dispenser to provide for the various bridge and width requirements.

In making the joint in the rim members 6, various types of connections may be used.

In Fig. II a bevelled type of joint is used at 12. In this type of joint the bevelled contacting faces 15 of one or both parts is solder coated or tinned. In using this type of connection, the dispenser determines the pupillary distance required for the wearer and the type of bridge to be used. He places the nasal and temple portion in proper longitudinal alignment in the clamp of an electric or electronic soldering machine, applies the current to melt the solder coating at 15, then allows the solder to solidify to produce the completed and united mounting.

In Fig. VIII, a half lap type of joint is used with the faces 15 tinned or soldered as in the case of the structure of Fig. VII. The assembling procedure is the same as that described for the structure of Fig. II.

In Fig. IX, a turnbuckle 16 is used to connect the rim parts 6. The ends of the rim parts 6 are provided with right and left hand screw threads respectively with the core of the turnbuckle threaded to suit.

With this construction, the parts are united and brought to the required position for width by turning or rotating the turnbuckle.

In Fig. X, one end of one of the rim parts 6, carries an abutment or bars 17 having an inner bore 18 into which the end of the other rim portion 6 slidably fits. The end of the rim portion 6 that is to fit in the bore 18, is tinned or solder coated.

This construction is assembled to proper width by entering the tinned or soldered end of one of the rim portions 6 into the bore 18 to proper position for the width of lens required, then placing the assembled parts in an electric or electronic soldering machine and proceeding as in the case of the structures of Figs. II and VIII above.

In Fig. XI is shown a combined strap connection and rim member connection for a mounting of the type shown in Fig. III.

In this construction, the strap connection 9 is carried by the rim connection 19. The rim connection 19 is like that of the rim connection 18 in Fig. X. The entrant end of one of the rim members 6 is tinned or soldered. The procedure in securing the rim parts together in proper aligned position is the same as that for the structure of Fig. X. In the construction of Fig. XI the rim portion 6 is offset to make longitudinal alignment with the bore 18, and the upper surface of the abutment 19 is aligned with the top lens line.

In Fig. XII, a modification of the structure of Fig. XI is shown. Here instead of a bored abutment as at 19 in Fig. XI, a half lap type of joint is used. Here the joint face 15 is tinned or soldered coated. The form of the lap surface at 15 may be either bevelled or flat as desired. The operation of longitudinally aligning and securing the parts together in required position is the same as that used for the other solder connections described above.

Fig. XIII shows a construction for a lens securing strap 9 used in the structure shown in Fig. III. The view shown represents a cross section on line 13—13 of Figs. XI and XII. The lens ear 20 of the strap connection engages the inner or face side of the lens. A sleeve or bushing 23 extends into the hole in the lens. On the outer face of the lens over the hole therein is a washer member 21 preferably of plastic or other semi-resilient or compressible material. The lens screw 22 extends through the opening in the washer into the sleeve 23. This construction provides a long screw thread engagement for the lens screw. The ear 20 may be secured to the rim joint connection as shown in Figs. XI and XII or to the rim member 6 as shown in Figs. III and IV.

The construction of Fig. XIII may be designed so as to have the screw member insertable from either the front or rear face of the lens.

In Fig. XIV is shown another form of pin and socket connection. While this form of connection may be located as desired between the temple and nasal ends of the rims, it will probably be less conspicuous if located to the rear of the lens on the nasal side thereof somewhat as indicated in Fig. XIV.

In the construction of Fig. XIV, the rim 24 is separated at the joint 29 located between the lens connection 3 and the top of the lens on the nasal side. The joint 29 is a pin and socket connection. The rim 24 on one side of the split is widened out to form an abutment 25, having the recess 26. On the other side of the split the rim is widened out again to form a second abutment member 27 designed to abut and engage the abutment 25. Projecting from the abutment 27, towards the abutment 25 is the pin 28. This pin member 28 is solder coated and of a cross section allowing it to fit into the recess 26 in the abutment 25. This pin member 28 is made longer than the depth of the recess 26 so the pin may be cut off to the length required by the length of rim that is to be used for the particular mounting. In some instances, the length of rim required may permit the abutments 25 and 27 to abut as shown in Fig. XVI, whereas in other instances, due to the length of rim required, the abutments 25 and 27 may be slightly separated as shown in Fig. XVII.

The operation of assembling the connection of Figs. XIV, XV, XVI and XVII is as follows: The lower portion of the rim 24 is secured to the mounting adjacent the lens connection 3. The upper part of the rim 24 is made separate and carries the temple connection on the end opposite the joint connection. The wearer is measured for his pupillary distance to obtain the length of rim required. The end of the pin 28 is then cut off to a length that will give the required rim length when the pin is secured in the recess 26. The pin 28 has been previously solder coated. The parts of the rim are aligned in position of required rim length and held in this position in a clamp on an electric soldering machine. The electric current is then turned on to melt the solder coating on the pin. When this is done, the current is turned off and the parts of the mounting allowed to cool to set the solder to securely solder the rim parts together to the required rim length.

In many respects, it will probably be found that the location of the rim joint on the nasal side of the lens adjacent the lens connection will be the most desirable position because it is adjacent the other connections of the bridge, guards and lens straps and hence not be so noticeable.

Instead of the lapping butts of the rim members 6 as shown in Figs. II and VIII, a straight butt 30, Fig. VII, may be used. If this plain butt structure is used, the butt end of one rim section is tinned or soldered coated and the other left uncoated, because with the plain butt structure the uncoated rim section will have to be cut off to adjust the rim to the required length for the pupillary distance required.

With this construction, the uncoated rim section is cut to required length, the rim sections then longitudinally aligned in an electric or electronic soldering machine and the parts united as described above for the structure of Figs. VII and VIII.

From the foregoing, it will be seen that all the objects and advantages of the invention have been obtained in simple and economical ways and that the production and dispensing of semirimless mountings have been greatly facilitated by a great reduction in the stock necessary to be produced and stocked to meet the demands for variations in sizes of mountings and styles of bridges therefor.

The assembling operations required for the dispensers to secure the parts together are very simple in character and well within the field of operations of the dispensers in the art.

The reduction in the number of mountings required for dispensers' stocks is of great advantage to the art, especially in war eras when the reduction of the amount of material and in the man power employed is of first moment. Procedure under this invention greatly reduces the investment in stock by the dispenser and as such is a matter of great importance in the art.

Having described my invention, I claim:

1. A lens supporting structure for use with a pair of lenses in an ophthalmic mounting, said structure comprising a bridge having connection means on its opposed sides adapted to be secured with the nasal portion of said lenses, bar-like portions extending outwardly from the opposed sides of said bridge and shaped to follow the upper contour of said lenses, and a pair of connection supporting members each adapted to be positioned adjacent the upper temporal portion of a respective lens, said connection supporting members each having connection means for securing with the temporal portion of said lens and having temple hinge means formed integrally therewith, said connection supporting members further having a portion formed with a recess adapted to be aligned with the upper edge of said lens and being of a shape to adjustably receive the temporal end of a respective bar-like portion, said temporal ends of the bar-like portions being slidably movable in said respective recesses whereby the separation between the nasal and temporal lens connection means may be adjusted to fit the lenses with which the structure is to be assembled.

2. A lens supporting structure for use with a pair of lenses having connection openings on the nasal and temporal sides thereof, said structure comprising a bridge having lens connection means embodying perforated ear portions on the opposed sides thereof adapted to be secured to the nasal sides of the lenses by means extending through the perforation in the ear portions and the respective openings in said nasal sides, bar-like portions extending outwardly from the opposed sides of said bridge and shaped to follow the upper contour of said lenses, and a pair of connection supporting members each embodying a portion formed with a recess therein extending longitudinally in the direction of the adjacent edge portion of a respective lens, an integral temple connection portion and a depending perforated ear portion adapted to be connected with a respective opening in the temporal side of the lens by connection means extending through said perforation in the ear portion and the opening in the lens, said longitudinally recessed portion being adapted to slidably receive the temporal end of a respective bar-like portion, the length of said bar-like portions and of said recessed portions being so controlled as to permit the structure to be fitted with lenses of different widths and to enable the aligning of the perforations of the ear portions with the respective connection openings in the lenses.

HARRY H. STYLL.

REFERENCES CITED

The following references are of record in the file of this patent:

UNITED STATES PATENTS

| Number | Name | Date |
|---|---|---|
| Re. 21,574 | Sweeney | Sept. 17, 1940 |
| 532,446 | Celles | Jan. 15, 1895 |
| 801,333 | Oehlschlager | Oct. 10, 1905 |
| 1,285,177 | Hochstein | Nov. 19, 1918 |
| 1,747,904 | Nerney | Feb. 18, 1930 |
| 1,972,479 | Ferris | Sept. 4, 1934 |
| 2,058,969 | Fishman | Oct. 27, 1936 |
| 2,108,875 | Uhlemann | Feb. 22, 1938 |
| 2,290,389 | Slotsky | July 21, 1942 |
| 2,318,537 | Stolper | May 4, 1943 |
| 2,355,053 | Carlson | Aug. 8, 1944 |
| 2,366,659 | Uhlemann et al. | Jan. 2, 1945 |
| 2,384,815 | Cozzens | Sept. 18, 1945 |
| 2,389,428 | Glasser | Nov. 20, 1945 |
| 2,443,249 | Jackson | June 15, 1948 |

FOREIGN PATENTS

| Number | Country | Date |
|---|---|---|
| 381,553 | France | Feb. 15, 1902 |
| 366,118 | Germany | Dec. 29, 1922 |
| 303,730 | Great Britain | Jan. 10, 1929 |